United States Patent
Sheridan

(10) Patent No.: US 10,578,017 B2
(45) Date of Patent: Mar. 3, 2020

(54) WINDMILL AND NEGATIVE-G OIL SYSTEM FOR GEARED TURBOFAN ENGINES

(71) Applicant: United Technologies Corporation, Farmington, CT (US)

(72) Inventor: William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 772 days.

(21) Appl. No.: 15/132,639

(22) Filed: Apr. 19, 2016

(65) Prior Publication Data

US 2016/0376988 A1 Dec. 29, 2016

Related U.S. Application Data

(60) Provisional application No. 62/183,417, filed on Jun. 23, 2015.

(51) Int. Cl.
*F02C 7/06* (2006.01)
*F01D 25/20* (2006.01)
(Continued)

(52) U.S. Cl.
CPC ............... *F02C 7/06* (2013.01); *F01D 5/02* (2013.01); *F01D 25/20* (2013.01);
(Continued)

(58) Field of Classification Search
CPC .... F02C 7/06; F02C 7/36; F02C 3/107; F01D 5/02; F01D 25/18; F01D 25/20;
(Continued)

(56) References Cited

U.S. PATENT DOCUMENTS 2,235,793 A * 3/1941 Berger ................. F01M 11/067
139/398
3,994,634 A 11/1976 Riddle et al.
(Continued)

FOREIGN PATENT DOCUMENTS

EP 2224120 A2 9/2010
WO 2015/060912 A2 4/2015

OTHER PUBLICATIONS

European Search Report for EP Application No. 16175830.5 dated Dec. 7, 2016.

*Primary Examiner* — Mark A Laurenzi
*Assistant Examiner* — Loren C Edwards
(74) *Attorney, Agent, or Firm* — Carlson, Gaskey & Olds, P.C.

(57) ABSTRACT

A lubrication system for a gear system of a geared turbofan engine, the lubrication system includes an upper strut including an upper sump. A lower strut includes a lower sump. The upper strut and the lower strut support a gear system. A conduit extends from the upper sump within the upper strut to the lower sump within the lower strut. A lubricant collector receives lubricant exhausted from the gear system and directing the received lubricant into one of the lower sump and the upper sump. A pump in communication with the conduit for drawing lubricant from at least one of the lower sump and the upper sump and communicates lubricant to a lubricant inlet of the gear system. The pump draws lubricant from the lower sump when operating within a positive g-force environment and draws lubricant from the upper sump when operating within a negative g-force environment. A geared turbofan engine is also disclosed.

16 Claims, 2 Drawing Sheets

(51) Int. Cl.
*F16H 57/04* (2010.01)
*F01M 11/06* (2006.01)
*F01D 5/02* (2006.01)
*F02C 3/107* (2006.01)
*F02K 3/04* (2006.01)
*F04D 29/32* (2006.01)
*F01M 1/02* (2006.01)

(52) U.S. Cl.
CPC ............ *F01M 11/067* (2013.01); *F02C 3/107* (2013.01); *F02K 3/04* (2013.01); *F04D 29/321* (2013.01); *F04D 29/325* (2013.01); *F16H 57/0443* (2013.01); *F01M 2001/0253* (2013.01); *F05D 2220/36* (2013.01); *F05D 2240/35* (2013.01); *F05D 2260/98* (2013.01)

(58) Field of Classification Search
CPC .................................................. F01M 11/067; F01M 2001/0253; F02K 3/04; F04D 29/321; F04D 29/325; F16H 57/045; F16H 57/0443; F05D 2220/36; F05D 2240/35; F05D 2260/98
USPC ........................................................ 60/39.08
See application file for complete search history.

(56) References Cited

U.S. PATENT DOCUMENTS

| | | | |
|---|---|---|---|
| 4,117,907 A * | 10/1978 | Lechler | F01M 11/067 |
| | | | 123/196 CP |
| 7,484,354 B2 * | 2/2009 | Stretton | F02C 7/32 |
| | | | 60/226.1 |
| 7,662,059 B2 | 2/2010 | McCune | |
| 7,883,438 B2 | 2/2011 | McCune | |
| 8,230,974 B2 | 7/2012 | Pamin | |
| 8,307,626 B2 * | 11/2012 | Sheridan | F01D 25/20 |
| | | | 184/26 |
| 8,572,943 B1 | 11/2013 | Sheridan | |
| 8,813,469 B2 | 8/2014 | Sheridan | |
| 8,978,829 B2 | 3/2015 | McCune et al. | |
| 2008/0116010 A1 | 5/2008 | Portlock et al. | |
| 2010/0105516 A1 | 4/2010 | Sheridan et al. | |
| 2012/0192570 A1 | 8/2012 | McCune et al. | |
| 2013/0028718 A1 * | 1/2013 | Strom | F01D 9/065 |
| | | | 415/182.1 |
| 2013/0098058 A1 | 4/2013 | Sheridan | |

* cited by examiner

WINDMILL AND NEGATIVE-G OIL SYSTEM FOR GEARED TURBOFAN ENGINES

CROSS REFERENCE TO RELATED APPLICATION

This application claims priority to U.S. Provisional Application No. 62/183,417 filed Jun. 23, 2015.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

The gear assembly requires lubricant flow during operation and anytime the gear assembly is moving. A lubrication system typically includes a pump driven by operation of the engine. However, when the engine is not operating, the fan and gear assembly may still rotate and require lubricant. Moreover, operation in a negative-G environment can disrupt lubricant flow. The lubrication system is therefore required to provide a minimum lubricant flow regardless of current engine operation and environmental conditions.

SUMMARY

In a featured embodiment, a lubrication system for a gear system of a geared turbofan engine, the lubrication system includes an upper strut including an upper sump. A lower strut includes a lower sump. The upper strut and the lower strut support a gear system. A conduit extends from the upper sump within the upper strut to the lower sump within the lower strut. A lubricant collector receives lubricant exhausted from the gear system and directing the received lubricant into one of the lower sump and the upper sump. A pump in communication with the conduit for drawing lubricant from at least one of the lower sump and the upper sump and communicates lubricant to a lubricant inlet of the gear system. The pump draws lubricant from the lower sump when operating within a positive g-force environment and draws lubricant from the upper sump when operating within a negative g-force environment.

In another embodiment according to the previous embodiment, the pump is driven by the gear system such that the pump delivers lubricant under any flight or non-flight condition.

In another embodiment according to any of the previous embodiments, the gear system drives a fan shaft and the fan shaft is coupled to the pump for driving the pump.

In another embodiment according to any of the previous embodiments, the pump includes a bi-directionally driven pump such that the pump will operate to draw lubricant from at least one of the upper sump and the lower sump responsive to rotation of the gear system in both a clockwise and counterclockwise direction.

In another embodiment according to any of the previous embodiments, the lubricant collector surrounds the gear system and includes an upper discharge opening and a lower discharge opening.

In another embodiment according to any of the previous embodiments, the upper strut and the lower strut include a structural support component of the geared turbofan engine.

In another embodiment according to any of the previous embodiments, the upper strut includes an upper cavity and the upper sump is disposed within the upper cavity and the lower strut includes a lower cavity and the lower sump is disposed within the lower cavity.

In another embodiment according to any of the previous embodiments, a main lubrication system includes a main pump drawing lubricant from a main lubricant reservoir and communicating lubricant from the main reservoir to the lubricant inlet of the gear system.

In another embodiment according to any of the previous embodiments, includes passages directing lubricant from the pump to the inlet of the gear system. The passages are configured to supply lubricant to the inlet of the gear system independent of the main lubrication system.

In another featured embodiment, a geared turbofan engine includes a fan configured to drive air along a bypass flow path and a core flow path. A compressor section is configured to communicate compressed air to a combustor section for generating a high energy gas flow for driving a turbine section where energy is extracted and utilized to drive compressor section and the fan through a geared architecture. An upper strut and a lower strut support the geared architecture relative to the fan section. A main lubrication system includes a main pump that communicates lubricant from a main reservoir to the geared architecture. An auxiliary lubrication system supplies lubricant to the geared architecture separate from the main lubrication system. The auxiliary lubrication system includes an upper sump within the upper strut. A lower sump is within the lower strut. A conduit extends from the upper sump within the upper strut to the lower sump within the lower strut. A lubricant collector receives lubricant exhausted from the geared architecture and directing the received lubricant into one of the lower sump and the upper sump. An auxiliary pump is in communication with the conduit for drawing lubricant from at least one of the lower sump and the upper sump and communicating lubricant to a lubricant inlet of the geared architecture. The auxiliary pump draws lubricant from the lower sump when operating within a positive g-force environment and draws lubricant from the upper sump when operating within a negative g-force environment.

In another embodiment according to the previous embodiment, the auxiliary pump is driven by the geared architecture such that the auxiliary pump delivers lubricant under any flight or non-flight condition.

In another embodiment according to any of the previous embodiments, the geared architecture drives a fan shaft and the fan shaft is coupled to the auxiliary pump for driving the auxiliary pump responsive to rotation of the fan.

In another embodiment according to any of the previous embodiments, the auxiliary pump includes a bi-directionally driven pump such that the auxiliary pump operates to draw lubricant from at least one of the upper sump and the lower sump responsive to rotation of the fan section in both a clockwise and counterclockwise direction.

In another embodiment according to any of the previous embodiments, includes passages directing lubricant from the auxiliary pump to the inlet of the geared architecture. The passages are configured to supply lubricant to the inlet of the geared architecture independent of the main lubrication system.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
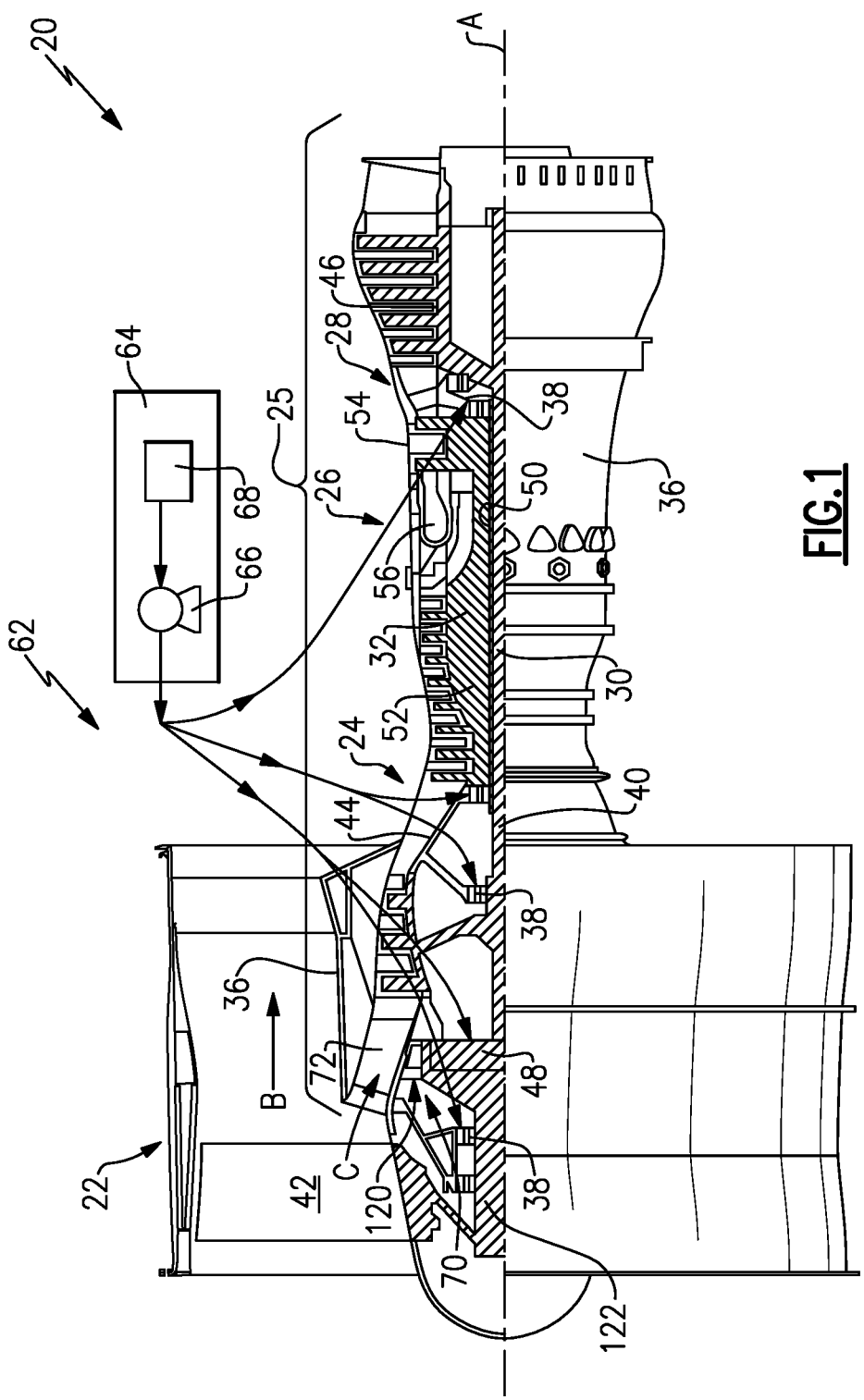
FIG. 1 schematically illustrates an embodiment of a geared turbofan engine.

FIG. 1 schematically illustrates an example geared turbofan engine 20 that includes a fan section 22 and an engine section 25. The engine section 25 includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce a high speed, high energy exhaust gas stream that is then expanded through the high pressure turbine 54 and low pressure turbine 46. The mid-turbine frame 58 includes vanes 60, which are in the core airflow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second. The disclosed example fan tip speed and fan pressure ratios are provided by the structure of the example engine 20 for operation at least at the bucket cruise thrust specific fuel consumption flight condition. As appreciated, the disclosed fan tip speed and fan pressure ratio are also applicable to other engine operating and flight conditions.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 includes a main lubrication system 64 and an auxiliary lubrication system 70. The main lubrication system 64 includes at least a main lubricant reservoir 68 and a main pump 66 for supplying lubricant to the various bearing systems 38 and the geared architecture 48. The auxiliary lubrication system 70 provides lubricant to the geared architecture 48 separate from the main lubrication system 64. The main lubrication system 64 functions during operation of the engine 20. However, the fan section 22 may still rotate without the engine operating when the aircraft is wind-milling on the ground or in-flight. Rotation of the fan section 22 drives a fan drive shaft 122 that in turn drives the geared architecture 48. Moreover, the main lubrication system 64 may not provide adequate lubricant to the geared architecture in negative gravity (G) environment or other condition as a result of events that interrupt lubricant flow from the main lubrication system 64.

Figure 2:
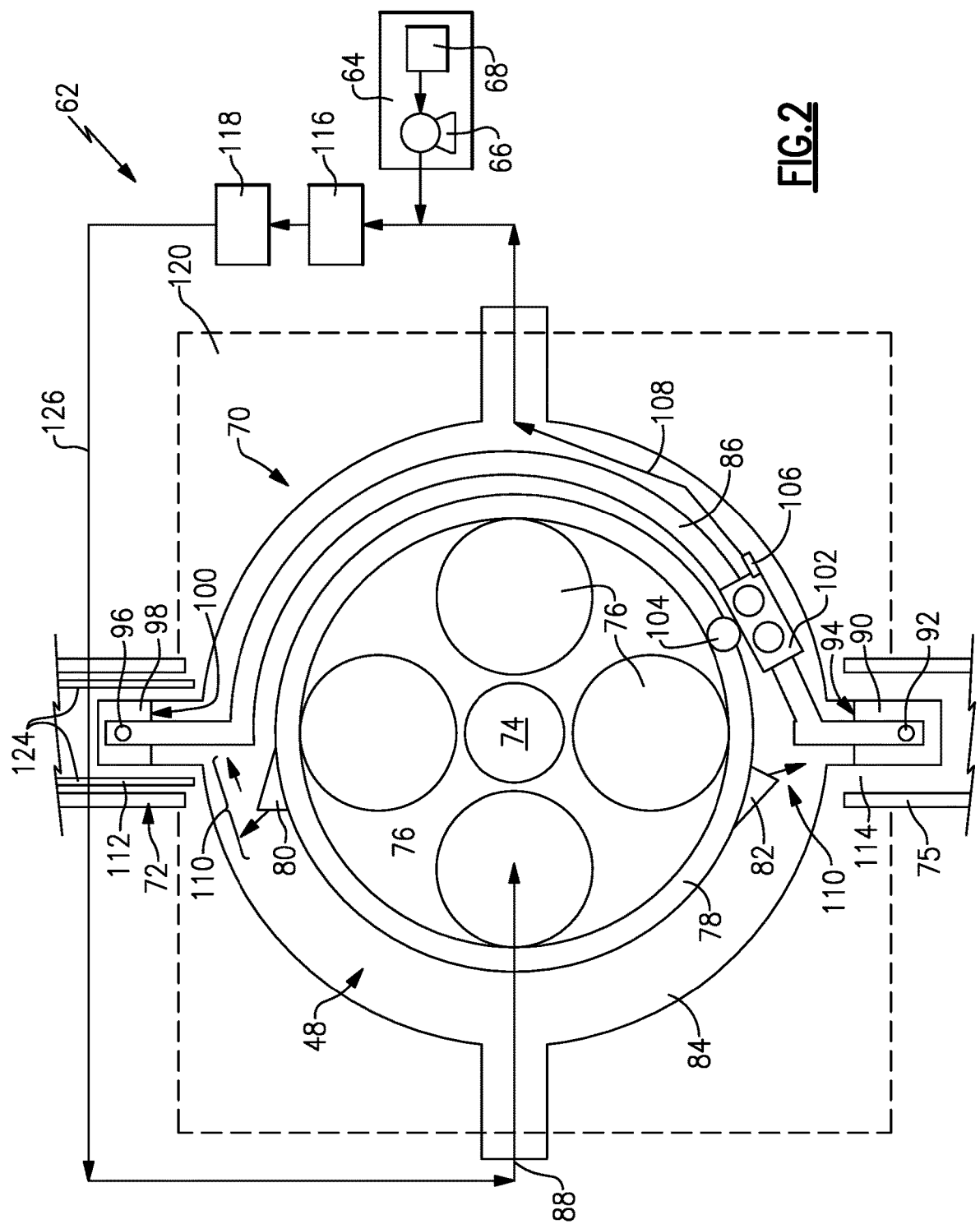
FIG. 2 schematically illustrates an example embodiment of a lubrication system for the geared turbofan engine.

The engine section 25 is at least partially supported relative to the fan section by an upper strut 72 and a lower strut 75 (FIG. 2). The geared architecture 48 is disposed within a bearing compartment 120 (schematically shown in FIG. 2) supported between the upper strut 72 and the lower strut 75.

Referring to FIG. 2 with continued reference to FIG. 1, the disclosed example lubrication system 62 includes the auxiliary lubrication system 70 that utilizes natural cavities within the struts 72, 75 instead of a separate lubricant tank or the main reservoir 68 to trap and store lubricant for use during operation when the main lubrication system 64 is unable to provide sufficient lubricant flow.

The geared architecture 48 is disposed within the bearing compartment 120 (schematically shown) and supported by the struts 72, 75 that pass through the core flow-path C. The struts 72, 75 structurally support the geared architecture 48 and loads generated by the fan 22 and transmits the loads to the mounting structure supporting the engine on the aircraft such as an engine pylon (not shown). The struts 72, 75 are also used to pass service lines, and lubricant conduits, schematically shown at 124, into and out of the bearing compartment 120. The struts 72, 75 include features utilized to store lubricant for the example auxiliary lubrication system 70.

The example geared architecture 48 includes a sun gear 74 that drives star gears 76 circumscribed by a ring gear 78. In this disclosed example embodiment, the ring gear 78 drives the fan shaft 122. It should be understood, that other gear architectures are within the contemplation of this disclosure and the disclosed configuration is provided as a non-limiting example embodiment. The geared architecture 48 is mounted within the bearing compartment 120 and is surrounded by a lubricant collector 84. The lubricant collector 84 directs lubricant expelled from the geared architecture 48 to one of the upper discharge 80 and the lower discharge 82 such that lubricant does not fall back into and is not immediately recirculated through the geared architecture 48.

During normal, positive-G environment operation, lubricant flows to the bottom of the compartment 120 to the lower discharge 82 where it is discharged (shown at 110). In a negative-G environment, lubricant flows 110 to the upper discharge 80.

The lower strut 75 defines a lower cavity 114 with a lower sump 90. The upper strut 72 defines an upper cavity 112 with an upper sump 98. The lower sump 90 and upper sump 98 are in communication with a common lubricant scavenge passage 86. The scavenge passage 86 includes a lower inlet 92 disposed within the lower sump 90 and an upper inlet 96 within the upper sump 98. A line 94 schematically indicates a level of lubricant within the lower sump 90 during operation in a positive-G environment. A line 100 schematically indicates a level of lubricant within the upper sump 98 during operation in a negative-G environment.

An auxiliary pump 102 is disposed in communication with the passage 86 to draw lubricant from both the lower sump 90 and the upper sump 98. The pump 102 operates to create a suction at each of the upper inlet 96 and the lower inlet 92 regardless of the operating environment. Accordingly, the pump 102 continually draws lubricant through at least one of the lower sump 90 and the upper sump 98.

During operation in a positive-G environment, lubricant accumulates in the lower sump 90, but not in the upper sump 98. The pump 102 generates suction at both the upper inlet 96 and the lower inlet 92. Accordingly, during operation in a positive-G environment, lubricant is drawn in to the passage 86 through the lower inlet 92, and little to no lubricant is drawn into the passage 86 from the upper inlet.

During operation in a negative-G environment, lubricant flows to the upper sump 98 and away from the lower sump 90. The auxiliary pump 102 continues to attempt to draw lubricant from both the upper inlet 96 and the lower inlet 92. Lubricant in the upper sump 98 is drawn into the passage 86 while little to no lubricant is drawn from the lower sump 90.

The pump 102 is coupled to the geared architecture 48 by a drive gear 104. The drive gear 104 may be driven directly by a portion of the geared architecture 48, such as the ring gear 78, or coupled to a structure driven by the geared architecture 48 such as the fan drive shaft 122. The drive gear 104 drives the auxiliary pump 102 responsive only to rotation of the fan section 22, and thereby the geared architecture. The auxiliary pump 102 is therefore operational and functioning to drive lubricant through the auxiliary lubrication system 70 even when the main lubrication system 64 is not operating. Accordingly, anytime the fan section 22 is turning, the auxiliary pump 102 will draw lubricant from either of two sumps 90, 98.

The example auxiliary pump 102 is bi-directional, meaning that regardless of the direction in which the fan section 22, and geared architecture 48 are driven, the auxiliary pump 102 will generate a suction to draw lubricant from the upper inlet 96 and the lower inlet 92. The bi-directionally driven auxiliary pump 102 therefore will operate to draw lubricant from at least one of the upper sump 98 and the lower sump 90 responsive to rotation of the geared architecture 48 in both a clockwise and counterclockwise direction The example auxiliary pump 102 is shown in this example embodiment located within the bearing compartment 120, but it is also within the contemplation of this disclosure that the auxiliary pump 102, may be driven by a structure outside the bearing compartment 120.

The auxiliary pump 102 drives lubricant 108 through an outlet 106 into passages of the lubrication system 62 back to a lubricant inlet 88 of the geared architecture 48. The auxiliary system 70 drives lubricant through passages 126 that share common flow paths with parts of the main lubrication system 64. The passages 126 are not impeded by the features of the main lubrication system. Lubricant flow from the auxiliary pump 102 proceeds through filters 116 and/or coolers 118 that condition the lubricant for use in the geared architecture 48. Although the main lubrication system 64 may utilize the same passage 126, filters 116 and coolers 118 when functioning, the main lubrication system 64 does not impede lubricant flow driven by the auxiliary lubrication system 70. The main pump 66 and main reservoir 68 are arranged such that the auxiliary lubrication system 70 may provide lubricant independent of the main lubrication system 64.

Accordingly, the example auxiliary lubrication system 70 draws lubricant accumulated in sumps located within the natural enclosed recesses within the struts 72, 75 supporting the bearing compartment 120. The accumulated lubricant is pumped through passage 126 and corresponding coolers 118 and filters 116 as needed to condition the lubricant for re-use. Because the auxiliary pump 102 is driven by rotation of the fan, when the engine is shut down, fan rotation will always deliver lubricant to the geared architecture.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A lubrication system for a gear system of a geared turbofan engine, the lubrication system comprising:
    an upper strut including an upper sump;
    a lower strut including a lower sump, the upper strut and the lower strut supporting the gear system;
    a conduit extending from the upper sump within the upper strut to the lower sump within the lower strut;
    a lubricant collector surrounding the gear system and receiving lubricant exhausted from the gear system and directing the received lubricant into one of the lower sump and the upper sump;
    a pump in communication with the conduit for drawing lubricant from at least one of the lower sump and the upper sump and communicating lubricant to a lubricant inlet of the gear system, wherein the pump draws lubricant from the lower sump when operating within a positive g-force environment and draws lubricant from the upper sump when operating within a negative g-force environment.

2. The lubrication system as recited in claim 1, wherein the pump is driven by the gear system such that the pump delivers lubricant under any flight or non-flight condition.

3. The lubrication system as recited in claim 2, wherein the gear system drives a fan shaft and the fan shaft is coupled to the pump for driving the pump.

4. The lubrication system as recited in claim 3, wherein the pump comprises a bi-directionally driven pump such that the pump will operate to draw lubricant from at least one of the upper sump and the lower sump responsive to rotation of the gear system in both a clockwise and counterclockwise direction.

5. The lubrication system as recited in claim 1, wherein the lubricant collector surrounds the gear system and includes an upper discharge opening and a lower discharge opening.

6. The lubrication system as recited in claim 1, wherein upper strut and the lower strut comprise a structural support component of the geared turbofan engine.

7. The lubrication system as recited in claim 6, wherein the upper strut includes an upper cavity and the upper sump is disposed within the upper cavity and the lower strut includes a lower cavity and the lower sump is disposed within the lower cavity.

8. The lubrication system as recited in claim 1, including a main lubrication system including a main pump drawing lubricant from a main lubricant reservoir and communicating lubricant from the main reservoir to the lubricant inlet of the gear system, wherein the main lubricant reservoir is disposed in a location separate of the upper strut and the lower strut.

9. The lubrication system as recited in claim 8, including passages directing lubricant from the pump to the inlet of the gear system, wherein the passages are configured to supply lubricant to the inlet of the gear system independent of the main lubrication system.

10. The lubrication system as recited in claim 1, including a bearing compartment supported by a radially inner end of each of the upper strut and the lower strut and each of the upper strut and the lower strut extends radially through a core flow passage.

11. A geared turbofan engine comprising:
    a fan configured to drive air along a bypass flow path and a core flow path;
    a compressor section configured to communicate compressed air to a combustor section for generating a high energy gas flow for driving a turbine section where energy is extracted and utilized to drive the compressor section and the fan through a geared architecture;
    an upper strut and a lower strut supporting the geared architecture relative to the fan section;
    a main lubrication system including a main pump that communicates lubricant from a main reservoir to the geared architecture, the main reservoir disposed outside of the upper strut and the lower strut; and an auxiliary lubrication system for supplying lubricant to the geared architecture separate from the main lubrication system, the auxiliary lubrication system including:

an upper sump within the upper strut, a lower sump within the lower strut, a conduit extending from the upper sump within the upper strut to the lower sump within the lower strut, a lubricant collector surrounding the geared architecture and receiving lubricant exhausted from the geared architecture and directing the received lubricant into one of the lower sump and the upper sump, and an auxiliary pump in communication with the conduit for drawing lubricant from at least one of the lower sump and the upper sump and communicating lubricant to a lubricant inlet of the geared architecture, wherein the auxiliary pump draws lubricant from the lower sump when operating within a positive g-force environment and draws lubricant from the upper sump when operating within a negative g-force environment.

12. The geared turbofan engine as recited in claim 11, wherein the auxiliary pump is driven by the geared architecture such that the auxiliary pump delivers lubricant under any flight or non-flight condition.

13. The geared turbofan engine as recited in claim 12, wherein the geared architecture drives a fan shaft and the fan shaft is coupled to the auxiliary pump for driving the auxiliary pump responsive to rotation of the fan.

14. The geared turbofan engine as recited in claim 13, wherein the auxiliary pump comprises a bi-directionally driven pump such that the auxiliary pump operates to draw lubricant from at least one of the upper sump and the lower sump responsive to rotation of the fan section in both a clockwise and counterclockwise direction.

15. The lubrication system as recited in claim 11, including passages directing lubricant from the auxiliary pump to the inlet of the geared architecture, wherein the passages are configured to supply lubricant to the inlet of the geared architecture independent of the main lubrication system.

16. The geared turbofan engine as recited in claim 11, including at least one service line for a system other than the lubrication system extending through at least one of the upper strut and the lower strut.

* * * * *